(12) United States Patent
Choju et al.

(10) Patent No.: US 8,119,999 B2
(45) Date of Patent: Feb. 21, 2012

(54) RADIATION-SHIELDING GLASS AND METHOD OF MANUFACTURING THE SAME

(75) Inventors: Ken Choju, Otsu (JP); Shinkichi Miwa, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 504 days.

(21) Appl. No.: 12/083,735

(22) PCT Filed: Oct. 13, 2006

(86) PCT No.: PCT/JP2006/320501
§ 371 (c)(1), (2), (4) Date: Apr. 18, 2008

(87) PCT Pub. No.: WO2007/046306
PCT Pub. Date: Apr. 26, 2007

(65) Prior Publication Data
US 2009/0242809 A1    Oct. 1, 2009

(30) Foreign Application Priority Data

Oct. 19, 2005  (JP) ................................ 2005-303880
Oct. 19, 2005  (JP) ................................ 2005-303881
Oct. 19, 2005  (JP) ................................ 2005-303882
Apr. 6, 2006   (JP) ................................ 2006-104870

(51) Int. Cl.
*C03C 4/08*    (2006.01)
*C03C 3/07*    (2006.01)
*C03C 3/072*   (2006.01)
*G21F 1/06*    (2006.01)

(52) U.S. Cl. ......... 250/515.1; 252/478; 501/75; 501/73; 501/74

(58) Field of Classification Search ............... 250/515.1; 252/478; 501/75, 73, 74, 77
See application file for complete search history.

(56) References Cited

U.S. PATENT DOCUMENTS

| | | | |
|---|---|---|---|
| 2,642,633 | A | 6/1953 | Dalton |
| 3,356,579 | A | 12/1967 | Harrington |
| 4,520,115 | A | 5/1985 | Speit et al. |

(Continued)

FOREIGN PATENT DOCUMENTS

GB     2196957     5/1988

(Continued)

OTHER PUBLICATIONS

International Search Report issued Dec. 19, 2006 in corresponding International (PCT) Application No. PCT/JP2006/320501.

(Continued)

*Primary Examiner* — Jack Berman
(74) *Attorney, Agent, or Firm* — Wenderoth, Lind & Ponack, L.L.P.

(57) ABSTRACT

Provided is a radiation-shielding glass, including a glass composition in % by mass of 10 to 35% $SiO_2$, 55 to 80% PbO, 0 to 10% $B_2O_3$, 0 to 10% $Al_2O_3$, 0 to 10% SrO, 0 to 10% BaO, 0 to 10% $Na_2O$, and 0 to 10% $K_2O$, in which the radiation-shielding glass has a total light transmission at a wavelength of 400 nm at a thickness of 10 mm of 50% or higher. Also provided is a radiation-shielding glass which has the similar glass composition and can be used for a gamma-ray shielding glass for a PET examination.

24 Claims, 3 Drawing Sheets

U.S. PATENT DOCUMENTS

| | | | |
|---|---|---|---|
| 4,721,690 | A | 1/1988 | Ross et al. |
| 5,057,464 | A | 10/1991 | Miwa et al. |
| 5,296,294 | A | 3/1994 | Suzuki et al. |
| 2005/0003726 | A1 | 1/2005 | Zguris et al. |

FOREIGN PATENT DOCUMENTS

| | | | |
|---|---|---|---|
| GB | 2 289 273 A | | 11/1995 |
| JP | 60-180930 | | 9/1985 |
| JP | 02-212331 | | 8/1990 |
| JP | 8-59287 | | 3/1996 |
| JP | 09208255 A | * | 8/1997 |
| JP | 10-072236 | | 3/1998 |

OTHER PUBLICATIONS

Hideki Kato et al., "Effective Dose Transmission Factor of Annihilation Gamma-rays for Radiation Shielding Materials", Japanese Journal of Radiation Safety Management, vol. 3, No. 1, 2004, pp. 15-20.

Korean Office Action (with partial English translation) issued Dec. 14, 2009 in corresponding Korean Application No. 10-2008-7009633.

*Japan Ministry of Health, Labor and Welfare, 2005, Study group for the security of the radiation safety in the PET examination institution,*Ed., Guideline for the security in FDG-PET examination (2005)—URL: http://www.jsnm.org/report/pet-anzen-gl.pdf.

Database WPI Week, 199137, Thomson Scientific, London, Abstract No. 1991-270223, Abstract of JP 03177331, Aug. 1, 1991.

Database WPI Week, 199742, Thomson Scientific, London, Abstract No. 1997-0453773, Abstract of Jp 09208255, Aug. 12, 1997.

Supplementary European Search Report in corresponding Application EP06811774.

A Japanese Office Action issued Oct. 28, 2011 in corresponding Japanese Application No. 2006-280638, with partial English translation.

* cited by examiner

RADIATION-SHIELDING GLASS AND METHOD OF MANUFACTURING THE SAME

TECHNICAL FIELD

The present invention relates to a radiation-shielding glass and a method of manufacturing the same. Particularly, the present invention relates to a technology for providing a radiation-shielding glass with an effective property and allowing the radiation-shielding glass to be properly used in any application depending on a demand.

BACKGROUND ART

In general, in order to block radiation, a metallic lead, iron, or concrete is used for the walls of facilities handling radiation, such as those of medical institutions. In this case, it is necessary to provide a room with a window when an equipment control room, an examination room, or the like is partitioned with concrete or the like. In addition, when an examination is performed by injection or inhalation of radiation-generating drug or the like into a subject, a protection screen is required for preventing the whole body of a doctor, a laboratory technician, a nurse, or the like from directly receiving radiation when observing the medical conditions of a subject close at hand, for example, by confirming the complexion and the pulse of the subject.

For ensuring the safety of the human body by blocking radiation, the window and the protection screen require abilities of blocking radiation from a radiation source, so-called radiation-shielding ability. Besides, if the existence of the subject cannot be precisely confirmed with eyes, various kinds of adverse effects will be caused. In the medical field, in particular, the examination results of the subject can be adversely affected. Thus, the window and the protection screen should be provided with visibility.

On the other hand, in recent years in the medical field, the execution of positron emission tomography (PET) examination, which can perform an early detection of cancer cells, has been promoted. Specifically, according to the following Non-patent Document 1, the PET examination represents the so-called "positron tomography". It describes that the PET-CT device or the like is a new examination method to diagnose the cause of illness and the symptom by taking the activity of the heart, brain, or the like as a tomogram.

As a diagnostic drug used for the PET examination, there is a compound in which a sugar component is labeled with a positron nuclide and the compound depending on the purpose of the examination is prepared in the form of an "injection" or an "inhalant". Thus, the compound can be incorporated into the body by intravenous injection or breathing, so a tomogram can be taken by the PET-CT device. In this case, positrons are released from the labeled compound and then collide with an electron to generate radiation. In other words, 18F-FDG, for example, causes a gamma ray which is equivalent to energy of 0.511 MeV, so the detection of the gamma ray by the PET-CT device enables to specify the presence or absence of cancer cells, a focus size, and the like.

Therefore, under the environment of the medical examination involving the PET examination, the subject given a diagnostic drug generates gamma rays in every direction, so an essential requirement is to prevent the body of an examiner such as a doctor from directly being exposed to the gamma rays.

Further, representative examples of the radiation-shielding windows and radiation-shielding protection screens conventionally known in the art include a PbO-containing glass with high radiation-shielding property disclosed in Patent Document 1 described below.

[Patent Document 1] JP 02-212331 A

[Non-patent Document 1] General study business for medical technology assessment of Grant-in-Aid for Scientific Research funded from the Ministry of Health, Labor and Welfare, 2005, Study group for the security of the radiation safety in the PET examination institution, Ed., Guide line for the security in FDG-PET examination (2005) URL: http://www.jsnm.org/report/pet-anzen-gl.pdf

DISCLOSURE OF THE INVENTION

Problems to be Solved by the Invention

The radiation-shielding glass disclosed in Patent Document 1 is the glass which is hard to cause a dielectric breakdown even it has high radiation-shielding property and contains a sufficient amount $CeO_2$ for preventing the glass from coloring by radiation. Specifically, the glass, which contains a predetermined amount of PbO for enhancing the radiation-shielding property and a sufficient amount of $CeO_2$ to inhibit coloring by radiation, further contains $Na_2O$ and $K_2O$ at a limited ratio to prevent the glass from a dielectric breakdown.

However, the radiation-shielding glass disclosed in the document is a technology for preventing the glass from coloring by radiation but not for inhibiting the inherent coloring of the glass. Therefore, needles to say, even if the radiation-shielding glass is prevented from coloring attributed to radiation, the inherent coloring of the glass is not inhibited as far as the glass is already colored with its inherent color.

Further, the PbO-containing glass conventionally used in medical facilities is excellent in radiation-shielding ability but has a disadvantage of poor visibility, because the PbO-containing glass is being colored to an extent that its transparency is inhibited inadversely. Therefore, as far as such glass is used as a radiation-shielding window or a radiation-shielding protection screen, a situation in which a subject cannot be precisely assessed with visual recognition will be caused. Particularly, in the medical field, it may result in an extremely serious problem such as a misdiagnosis.

In spite of such a disadvantage, it is the actual condition that transparency, an important property with respect to visual recognition of the subject, is not considered at all. Therefore, a problem arises in that, with respect to the degree of transparency of such kind of glass, the level required for reasonable visibility is unknown.

Therefore, the first object of the present invention is to provide a radiation-shielding glass capable of ensuring appropriate transparency to make sufficient visibility of the subject in addition to ensuring sufficient radiation-shielding ability.

It is the actual condition that, as radiation-shielding means for the PET examination, any established effective material has not been found with respect to what kind of material is optimally used as a principal material among metallic lead, iron, glass, and the like even if a radiation-shielding window or a radiation-shielding protection screen is prepared. In other words, it is extremely important that the radiation-shielding means for the PET examination ensures sufficient radiation-shielding ability and sufficient visibility to prevent the body from directly being exposed to gamma rays while a doctor precisely confirm the complexion or the like of the subject.

In that case, even if a shielding window or a shielding protection screen against gamma rays is fabricated using glass, it is the actual condition that a matter of how to optimize the basic composition of glass for properly shielding the gamma rays emitted from the subject and for properly recognizing the subject visually is not yet clarified in the PET examination. Therefore, in the field of the PET examination, an engineering development of improving the glass to impart an excellent property will not be performed with a proper directional guideline in the future unless the basic composition of glass for shielding gamma rays is found out first.

Therefore, a second object of the present invention is to find out the basic composition of glass capable of ensuring good visibility of the subject in addition to ensuring sufficient shielding ability against gamma rays emitted from the subject when the PET examination is performed.

Means for Solving the Problems

A radiation-shielding glass according to the present invention is devised to solve the first object and includes a glass composition in % by mass of 10 to 35% $SiO_2$, 55 to 80% PbO, 0 to 10% $B_2O_3$, 0 to 10% $Al_2O_3$, 0 to 10% SrO, 0 to 10% BaO, 0 to 10% $Na_2O$, and 0 to 10% $K_2O$. The radiation-shielding glass has a total light transmission at a wavelength of 400 nm at a thickness of 10 mm of 50% or more. Here, the term "at a thickness of 10 mm" described above means a case in which the radiation-shielding glass is assumed to be a plate glass with a plate thickness of 10 mm. In addition, the term "total light transmission" means an average total light transmission with respect to the plate glass (hereinafter, the same will apply). Note that, the term "percent (%)" represented in the following description indicates "% by mass".

The radiation-shielding glass constructed as described above contains 55% or more of PbO, so the radiation-shielding ability thereof can be substantially enhanced. In addition, the total light transmission of the radiation-shielding glass is 50% or more at a wavelength of 400 nm at a thickness of 10 mm. Thus, it becomes possible to ensure a suitable transparency to obtain sufficient visibility. Further, components other than PbO in the composition are limited in the predetermined ranges. Thus, a glass which is hard to be devitrified can be obtained with a result that the viscosity of the glass can be increased at the time of forming molten glass. Consequently, it becomes possible to obtain a glass with a large plate thickness. Therefore, the radiation-shielding glass, which can be provided with high transparency, radiation-shielding ability, and devitrification resistance at once, can be obtained. In particular, if the radiation-shielding glass has a large plate thickness, the radiation-shielding ability and the transparency can be maintained at very high levels. Consequently, the radiation-shielding glass having a very advantageous merit can be realized.

In this case, it is preferable that the surface of the radiation-shielding glass be subjected to a low-reflection treatment with the formation of a thin film (e.g., antireflection film) having an appropriate refractive index and an appropriate thickness. The reflection loss of the radiation-shielding glass thus obtained is preferably 0.3 to 4.0, and the lower limit thereof may be 0.5, but the upper limit thereof is more preferably 3.5.

In this way, like the above radiation-shielding glass, the visibility of the glass can be more improved while the total light transmission thereof at a wavelength of 400 nm at a thickness of 10 mm is 50% or more. Here, the reflection loss R of the glass is a value which can be calculated by $R=((n-1)/(n+1))^2$, where n represents the refractive index of the glass.

Further, a radiation-shielding glass according to the present invention is devised to solve the second object and includes a glass composition in % by mass of 10 to 35% $SiO_2$, 55 to 80% PbO, 0 to 10% $B_2O_3$, 0 to 10% $Al_2O_3$, 0 to 10% SrO, 0 to 10% BaO, 0 to 10% $Na_2O$, and 0 to 10% $K_2O$. The radiation-shielding glass is used for a gamma-ray shielding material for a PET examination.

In other words, the inventors of the present invention have found that the radiation-shielding glass having such a basic composition can be appropriately used as a gamma-ray shielding material for use in PET examination. Specifically, as already described, PbO amount is 55% or more, so the radiation-shielding ability can be extensively enhanced. Besides, components other than PbO in the composition is limited in the respective predetermined ranges, so the radiation-shielding glass, which can be provided with high transparency, radiation-shielding ability, and devitrification resistance at once, can be obtained. In particular, if the radiation-shielding glass has a large plate thickness, the radiation-shielding ability and the transparency can be maintained at very high levels. As far as the glass is provided with such properties, a desired base material having a sufficient gamma-ray shielding property and a sufficient visibility can be obtained as a gamma-ray shielding material for use in PET examination. Therefore, in the field of the PET examination, a novel and useful gamma-ray shielding glass, that is, the gamma-ray shielding glass which enables to prevent an examiner such as a doctor from directly being exposed to the gamma rays emitted from a subject due to the administration of a diagnostic drug and to prevent the doctor or the like from making a misdiagnosis on the subject (patient) at the time of checking a complexion thereof, can be obtained.

The radiation-shielding glass preferably includes 200 ppm or less of $Fe_2O_3$ and 50 ppm or less of $Cr_2O_3$.

When the radiation-shielding glass is constructed as above, the coloring of the glass due to $Fe_2O_3$ and $Cr_2O_3$ contained as impurities can be suppressed as far as possible. In other words, the inventors have found that factors having influence on the transparency of the radiation-shielding glass are glass impurities typified by $Fe_2O_3$ and $Cr_2O_3$ as those having significant influence thereon, and that a significant improvement in transparency of the radiation-shielding glass can be attained by limiting the content of $Fe_2O_3$ to 200 ppm or less and limiting the content of $Cr_2O_3$ to 50 ppm or less. Here, the reason why the radiation-shielding glass is colored with $Fe_2O_3$ and $Cr_2O_3$ contained as impurities is that PbO shows the absorption of light in an ultraviolet range and thus affects the coloring of the glass even if the contents of $Fe_2O_3$ and $Cr_2O_3$ as impurities are small. In particular, even if the contents thereof are very little, PbO has a property of coloring the glass when the melting temperature of the glass is high. It may be due to the oxidation-reduction reaction of Fe ion or a change in coordination number of Fe ion. Therefore, from a view point of suppressing coloring the glass, it is important to strictly control the impurities of $Fe_2O_3$ and $Cr_2O_3$. Thus, the coloring of the radiation-shielding glass can be suppressed as far as possible by limiting the contents of $Fe_2O_3$ and $Cr_2O_3$, which are contained as impurities in the glass, to 200 ppm or less and 50 ppm or less, respectively.

The impurities of $Fe_2O_3$ and $Cr_2O_3$ are mixed in the glass from raw materials or from equipment used in the process of grinding or mixing the raw materials (e.g., equipment constructed of materials such as iron and stainless steel). Thus, the contents of $Fe_2O_3$ and $Cr_2O_3$ in the glass can be reduced by using a raw material with small contents of $Fe_2O_3$ and $Cr_2O_3$. In addition, the materials of the equipment used in the process of grinding or mixing the raw materials may be replaced with materials which can be hardly mixed with $Fe_2O_3$ and $Cr_2O_3$ or materials without mixing with $Fe_2O_3$ and $Cr_2O_3$, or the process of removing $Fe_2O_3$ and $Cr_2O_3$ may be introduced, thereby reducing the content of $Fe_2O_3$ and $Cr_2O_3$ in the glass. By taking the above measures, the content of $Fe_2O_3$ in the glass can be limited to 200 ppm or less and the content of $Cr_2O_3$ in the glass can be limited to 50 ppm or less.

Radiation used in medical facilities include X-rays and gamma rays which have different strengths of radiation energies. In other words, the permeability of gamma-ray is higher than that of X-ray, so the radiation-shielding glass should have a large plate thickness for providing the radiation-shielding glass with a sufficient radiation-shielding property. In medical facilities dealing with gamma rays, the desired transparency of the radiation-shielding glass to be used in a radiation-shielding window and a radiation-shielding protection screen is an extremely important property in combination with a condition that the above plate thickness should be enlarged.

On the other hand, it is necessary to examine many subjects in any of medical facilities dealing with the PET examination, so radiation is continuously emitted from the subjects injected with or inhaling drugs all around a facility for pharmaceutical synthesis, a facility for drug preparation, a drug infusion room, a waiting room for subjects, an examination room, and the like in any of medical facilities dealing with the PET examination.

Therefore, a serious problem may occur that doctors, laboratory technicians, and nurses, who carry out the examination, will be cumulatively covered with and exposed to the radiation. According to the above Non-patent Document 1, a guideline about a decrease in exposure dose of a laboratory technician or about radiation protection is disclosed. Gamma rays generated from positron nuclide have an effective dose equivalent of 2.2 mm sievert. It is assumed that the laboratory technician is exposed to a large amount of radiation within a short time in consideration of each actual equivalent dose corresponding to 0.3 mm sievert per once in the chest X-ray examination.

From the above point of view, the radiation exposure management for doctors and the like is important in the medical facilities dealing with the PET examination. Thus, it is required that the radiation-shielding glass have sufficient radiation-shielding ability, so the composition of the glass should necessarily contain a lot of PbO. Therefore, if the content of PbO is 55% or more, the glass can be provided with higher radiation-shielding ability than the conventional radiation-shielding glass in addition to the previously-explained advantages, thereby being applicable to those applications.

In addition, the plate thickness of the radiation-shielding glass should be enlarged to shield radiation as far as possible. For stably forming a glass with a large plate thickness, however, the glass should be molded in a high viscosity state. Thus, there is a need of a glass without being devitrified at high viscosity, with high liquidus viscosity. In addition, for shielding against radiation as far as possible, there is a need of including a large amount of PbO in the glass composition of the radiation-shielding glass. In this case, however, the glass tends to become thermally unstable, so the glass which is more difficult to be devitirified can be required. The radiation-shielding glass includes components other than PbO in the glass composition which are limited in the predetermined ranges, so it can show extremely high thermal stability and the plate thickness of the glass can be easily enlarged even when the content of PbO is high.

The radiation-shielding glass preferably includes 100 to 20,000 ppm of $Sb_2O_3$ as the glass composition, includes 0 to 20,000 ppm of $Cl_2$ as the glass composition, or the glass composition is substantially free from $As_2O_3$.

In this way, a clarifier used may be $Sb_2O_3$ or $Cl_2$, and $As_2O_3$ harmful to the environment is not contained. Thus, there is no risk of polluting the environment at the time of performing the glass production process or waste glass disposition. Besides, $Sb_2O_3$ or $Cl_2$ is a clarifier with a property of generating a large amount of clear gas when melting glass is in low temperature, so the following advantages may be also provided.

That is, as already stated, from a viewpoint of suppressing the coloring of the glass, it is important to control impurities, $Fe_2O_3$ and $Cr_2O_3$, strictly. On the other hand, it may be also important to reduce the melting temperature of the glass in order to inhibit the reaction of Fe ion or the like. Simultaneously, it is also important to reduce the melting temperature of the glass from an energy standpoint. However, if the melting temperature of the glass is lowered, the viscosity of the glass at the time of melting becomes high, which makes it difficult to obtain a foamless glass. In order to obtain the foamless glass, it is important to use a clarifier which generates clear gas within a temperature, ranging from the temperature at the time of vitrification reaction to the temperature at the time of homogenization melting. In addition, the clarification of the glass is carried out such that gas generated in the vitrification reaction is purged out of the glass melt by clear gas and minute foam remained at the time of the homogenization melting is then floated and removed by enlarging the diameter of the foam with the clear gas which is generated again. However, if the viscosity of the glass at the time of melting is high, these effects are hard to obtain. The radiation-shielding glass of the present invention is defined based on the above findings and has a composition that allows the glass to be molten at low temperatures. Specifically, the content of PbO is 55% or more to make the glass capable of being molten at low temperatures while $Sb_2O_3$ or $Cl_2$ which generates a large amount of clear gas at low temperature is used as a clarifier. Thus, it becomes possible to solve the above disadvantages of melting property at low temperatures, foam quality, and transparency at once.

Further, the radiation-shielding glass preferably has a chromaticity for a C light source calculated from a total light transmission at 380 to 700 nm in a region surrounded by X and Y coordinates (X,Y)=(0.3101, 0.3160), (0.3250, 0.3160), (0.3250, 0.3400), and (0.3101, 0.3400). Here, the term "chromaticity" described above means a measured value of a plate glass with a plate thickness of 10 mm when the radiation-shielding glass is assumed to be a plate glass and the term "total light transmission" means an average total light transmission of the plate glass (hereinafter, the same will apply).

In this way, the transparency of the glass can be secured more reliably. In other words, if the chromaticity of the glass is out of the above range, the coloring glass becomes remarkable and the transparency of the glass becomes worse, thereby making the visibility worse. Thus, those disadvantages can be avoided by placing the chromaticity within the above range.

The radiation-shielding glass preferably has a liquidus viscosity of $10^{3.5}$ dPa·s or more.

Thus, a liquidus viscosity of $10^{3.5}$ dPa·s or more allows the glass to be thermally stable without particles and devitrification even if the glass is formed at high viscosity. As a result, the forming of glass with large plate thickness can be attained. On the other hand, if the liquidus viscosity is less than $10^{3.5}$ dPa·s, the glass is easily devitrified and its stable production becomes difficult. Thus, it becomes difficult to obtain the glass with large plate thickness. In particular, the glass with a large PbO content has a tendency of being devitrified easily, so the glass is preferably provided with a liquidus viscosity of $10^{3.5}$ dPa·s or more. In this case, the glass may have a liquidus viscosity of $10^{3.0}$ dPa·s or more. Note that the liquidus viscosity of the glass can be increased by raising the content of $SiO_2$ while lowering the content of $B_2O_3$.

Here, the term "liquidus viscosity" described above means the viscosity of the glass at liquidus temperature. Specifically, the liquidus temperature of the glass indicates a value obtained by placing a powdery sample with 300 to 500 μm in size, which is sufficiently washed, in a platinum boat, retaining it for 48 hours in an electric furnace with a temperature gradient of 800 to 500° C., cooling it in the air, and measuring a temperature when the deposition of a crystal is initiated in the glass. The liquidus viscosity of the glass represents a value obtained such that the viscosity thereof equivalent to liquidus temperature is calculated from a viscosity curve formed from viscosity obtained by the platinum pulling-up method. Note that it is preferable to grind the surface of the glass because the deposit position of a crystal deposited in the glass is easily distinguished.

Further, the radiation-shielding glass as described above preferably has a density of 4.00 g/cm³ or more.

In other words, when the glass has a density of less than 4.00 g/cm³, a disadvantage of difficulty in obtaining high radiation-shielding ability is caused. Thus, the density is favorably in the above numerical value range. From such a viewpoint, the density of the glass is more preferably 4.20 g/cm³ or more. Further, the density of the glass can be raised by an increase in content of each of PbO, SrO, and BaO.

Further, the strain point of the above radiation-shielding glass is preferably 360° C. or more.

In other words, if the strain point is lower than 360° C., a disadvantage in that the glass tends to be influenced by thermal deformation or thermal shrinkage in the thermal process is caused. Thus, the strain point is favorably in the above numerical value range. From such a viewpoint, the strain point is more preferably 380° C. or more. Note that the strain point can be raised by an increase in content of each of $SiO_2$ and $Al_2O_3$.

Further, the radiation-shielding glass has a plate-like body formed in a plate shape and the plate-like body preferably has a plate thickness of 10 mm or more.

Thus, because the glass is a plate-like body in the form of a plate, radiation can be shielded over a large area. In addition, a sufficient radiation-shielding ability can be obtained by forming the plate-like body with a plate thickness of 10 mm or more. Thus, gamma rays with higher permeability than X rays can be effectively shielded. In particular, the glass effectively shields gamma rays generated from positron nuclide with a high effective dose. Thus, a doctor, a laboratory technician, a nurse, or the like who performs the PET examination can be effectively prevented from a situation of being cumulatively stand in radiation and exposed to the radiation. From such a viewpoint, the plate thickness of the plate-like body is 14 mm or more, preferably 18 mm or more, and more preferably 22 mm or more. Note that the upper limit of the plate thickness of the plate-like body is preferably 60 mm.

In addition, the radiation-shielding glass described above has a gamma-ray attenuation coefficient of preferably 0.5 $cm^{-1}$ or more, more preferably 0.55 $cm^{-1}$ or more, still more preferably 0.6 $cm^{-1}$ or more, and further preferably 0.65 $cm^{-1}$ or more at a gamma-ray energy of 0.511 MeV. Here, the radiation attenuation coefficient (gamma-ray attenuation coefficient) is used as a parameter representing radiation-shielding ability, or a numeric value representing how much incident radiation is absorbed. The larger the value of the gamma-ray attenuation coefficient is, the more excellent the radiation-shielding ability is.

In other words, if the gamma-ray attenuation coefficient is less than 0.5 $cm^{-1}$ at a gamma-ray energy of 0.511 Mev, a sufficient radiation-shielding ability cannot be obtained. Thus, the gamma-rays having higher permeability than the X-rays cannot be effectively shielded. Further, the gamma-rays generated from positron nuclide with a high effective dose cannot be effectively shielded, so a doctor who performs the PET examination may be cumulatively stand in radiation and then resulted in a situation of being exposed to the radiation. Therefore, if the gamma-ray attenuation coefficient is in the above numerical value range, such a disadvantage will hardly occur.

In this case, for attaining the above second object, the radiation-shielding glass having a characteristic feature of being used for a gamma-ray shielding material for the PET examination is preferably used in a gamma-ray shielding window or a gamma-ray shielding protection screen.

Thus, the radiation-shielding glass can be used in a gamma-ray shielding window for the PET examination or a gamma-ray shielding protection screen for the PET examination, so the gamma rays generated from positron nuclide with high radiation permeability can be effectively shielded. Thus, a doctor, a laboratory technician, a nurse, or the like who performs the PET examination can be effectively prevented from a situation of being cumulatively stand in radiation and exposed to the radiation. In particular, if it is used as a gamma-ray shielding protection screen for the PET examination, a more preferable effect can be obtained, because the distance between a subject and a doctor or the like interrupted by the screen is short and there is a high necessity to avoid the radiation exposure. In addition, when a laboratory technician or a nurse observes the medical conditions of a subject close at hand, the medical conditions of the subject (e.g., the complexion or the like of the subject) can be properly determined visually. Therefore, problems such as a misdiagnosis by misobserving the medical conditions of the subject, are effectively avoided.

On the other hand, for attaining the above first object, the radiation-shielding glass having a feature of having a total light transmission of 50% or more at a wavelength of 400 nm at a thickness of 10 mm is preferably used in a gamma-ray shielding window for medical purposes or a gamma-ray shielding protection screen for medical purposes.

Thus, the radiation-shielding glass has a high radiation-shielding ability, excellent transparency without coloring, and high liquidus viscosity while being capable of increasing the plate thickness of the glass, so it can further enhance the gamma-ray shielding ability. In addition, when a laboratory technician or a nurse observes the medical conditions of a subject close at hand, the medical conditions of the subject can be properly determined visually.

Further, the radiation-shielding glass is preferably used for a gamma-ray shielding window for a PET examination or a gamma-ray shielding protection screen for a PET examination.

Thus, gamma rays generated from positron nuclide with high radiation permeability can be effectively shielded, so a doctor, a laboratory technician, a nurse, or the like who performs the PET examination can be effectively prevented from a situation of being cumulatively stand in radiation and exposed to the radiation. In particular, the window or the protection screen has excellent transparency. Thus, when a laboratory technician or a nurse observes the medical conditions of a subject close at hand, the medical conditions of the subject (e.g., the complexion or the like of the subject) can be more properly determined visually. Therefore, problems such as a misdiagnosis by misobserving the medical conditions of the subject, are more effectively avoided.

The radiation-shielding glass is a glass plate formed in a plate shape, and it is preferable that an effective dose build-up factor for the radiation based on a glass composition and a density of a glass plate to be formed be calculated before the formation of the glass plate, an effective dose transmission of the glass plate to be formed for the radiation be calculated by multiplying the effective dose build-up factor by a transmission when the radiation is perpendicularly incident on the glass plate to be formed, and a theoretical plate thickness value of the glass plate to be formed be determined based on the effective dose transmission, and an actual plate thickness is set to be equal to or higher than the theoretical plate thickness value.

Thus, the transmission (transmission without a consideration of an influence of scattered rays of radiation) when the radiation is perpendicularly incident on the glass plate to be molded is corrected by an effective dose build-up factor (hereinafter, simply referred to as build-up factor) that represents an increment of the dosage by the scattered rays. Based on the amended transmission (effective dose transmission), the plate thickness of the glass plate to be formed (i.e., theoretical plate thickness value) is determined. Therefore, the radiation-shielding glass plate is formed based on the theoretical plate thickness value in consideration of an influence of the scattered rays of the radiation. Consequently, the radiation including scattered rays can be properly shielded and the desired radiation-shielding ability can be ensured with an appropriate plate thickness. Thus, the plate thickness becomes unnecessarily large with respect to the desired radiation-shielding ability. Therefore, the situation where unrighteous soaring costs of the radiation-shielding glass plate can be avoided reliably.

Here, the fact that radiation can be shielded means that the incident radiation is absorbed by the shield. The radiation is attenuated by the photoelectric effect or the Compton scattering in the shield. As shown in FIG. 1, when the energy of radiation incident on the substance is small, almost all of the radiation can be attenuated according to the photoelectric effect where the radiation collides with electrons in atoms and completely lose the energy thereof. In contrast, when the energy of radiation increases and enters the energy region of gamma-rays exceeding 200 KeV, the degree of attenuation of gamma-rays in the substance is almost equal to the degree due to the Rayleigh scattering or the Compton scattering. The Rayleigh scattering is a phenomenon in which the gamma rays only change the direction thereof without loss of energy by colliding with electrons in atoms. However, the Compton scattering is a phenomenon in which a part of the energy of the gamma-rays incident on the substance is given to electrons to change the energy state thereof and the direction thereof. As a result, the gamma rays are considered to be absorbed and scattered.

In general, for the shielding performance, a plate thickness at which the transmission of the lead glass and the transmission of lead against a direct ray become equal is represented by a parameter of a lead equivalent. If the gamma ray (direct ray) of the lead glass of 10 mm in thickness has a gamma-ray attenuation rate of 50% and lead of 3 mm in thickness has a gamma-ray attenuation rate of 50%, then the glass of 10 mm in thickness has a shielding ability of 3 mm Pb (3 mm equivalent).

Further, as shown in FIG. 2(A), when a radiation emitted from a radiation source is a narrow beam, the gamma-ray intensity entered into a shield (radiation-shielding glass plate) is defined as $I_0$, the gamma-ray intensity exited the shield is defined as I, the linear attenuation coefficient of the shield corresponding to the energy of gamma-ray to be used is defined as $\mu$ (/cm), and the thickness of the shield is defined as t (cm), the relationship of $I=I_0\times\exp(-\mu t)$ can be established. However, when the radiation emitted from the radiation source are spreading beams, the relation of $I=B\times I_0\times\exp(-\mu t)$ where the build-up factor of the shield is defined as B can be established. For example, in the case of the PET examination, the radiation source is a subject, radiation can be radiated in all angles as illustrated in FIG. 2(B). A part of the radiation is scattered when passing through the shield and the direction thereof is changed. Thus, with respect to the dose of the radiation passing through the shield, the dose of photons or the like being scattered is added to the dose of radiation rays directly passing through the shield. Therefore, for obtaining a dose rate after the radiation passing through the shield, the equation of $I=B\times I_0\times\exp(-\mu t)$ should be used in consideration of the dose scattering on the shield.

In the case of carrying out the shielding calculation for the radiation-shielding glass plate, a lead equivalent is generally used. In other words, first, the transmission of lead should be revealed. The data of transmission and build-up factor B of lead is described in "Shielding calculation business manual for radiation facilities, 2000" edited and published by the Nuclear Safety Technology Center (incorporated association) and widely used for the databases of the shielding calculation.

At present, the influence of scattering is not considered when the lead glass commercially marketed for the X-ray shielding is diverted to a radiation-shielding glass plate for the PET examination. Thus, the risk is increasing because the amount of gamma-rays actually permeating the glass is increasing, and the amount of the radiation exposure also increases. In particular, when the radiation energy enters the energy region of gamma rays, which exceeds 200 KeV, the plate thickness of the shield should be designed, considering the influence of gamma rays scattered in the shield. Thus, the build-up factor B of the radiation-shielding glass plate is calculated by a computer simulation and the plate thickness thereof is then designed using the build-up factor B. As a result, a glass with higher safety with respect to gamma ray shielding can be designed and provided.

In the radiation-shielding glass, it is preferable that the theoretical plate thickness value be obtained by further making a comparison between an effective dose transmission of lead obtained based on an effective dose build-up factor of lead with respect to the radiation and the effective dose transmission of the glass plate to be formed.

Thus, the theoretical plate thickness value of the glass plate to be formed can be determined based on lead with a demonstrated radiation-shielding ability. Thus, when the radiation-shielding glass is actually formed based on the theoretical plate thickness value, the radiation-shielding ability required for the radiation-shielding glass can be ensured with a more appropriate plate thickness.

Further, it is preferable that the theoretical plate thickness value be set to a value where the effective dose transmission of the glass plate to be formed is 60% or less with respect to a gamma ray at 0.511 MeV.

Thus, for example, the radiation-shielding glass formed with a theoretical plate thickness value can be suitably utilized as a gamma-ray shielding window or a gamma-ray shielding protection screen used in the PET examination.

In addition, the effective dose build-up factor of the glass plate to be formed is preferably calculated by Monte Carlo method.

Thus, the build-up factor of a glass plate to be formed can be accurately calculated in a simple manner.

Further, the radiation-shielding glass preferably has, when the theoretical plate thickness value is defined as t, the actual plate thickness in the range of t or more and 1.3 t or less.

In other words, if the radiation-shielding glass plate has a plate thickness less than a theoretical plate thickness value t, the radiation containing scattered rays cannot be sufficiently shielded. In addition, if the plate thickness of a radiation-shielding glass plate for medical uses is more than 1.3 times higher than the theoretical plate thickness value t, the plate thickness is unnecessarily enlarged with respect to the desired radiation-shielding ability, resulting in unrighteous soaring costs. Therefore, if the radiation-shielding glass plate for medical uses has a plate thickness (t or more and 1.3 t or less) in the above-mentioned numerical value range, the radiation containing scattered rays can be appropriately shielded and the desired radiation-shielding ability can be satisfied with the optimal plate thickness. Further, a decrease in visibility due to an unnecessary increase in plate thickness of the radiation-shielding glass plate for medical uses can be favorably avoided. In other words, for example, the medical conditions of the subject can be favorably observed through the radiation-shielding glass plate for medical uses.

Further, the radiation-shielding glass preferably has a density of 4.00 g/cm$^3$ or more, and an effective dose transmission of 60% or less with respect to a gamma ray at 0.511 MeV.

Those radiation-shielding glasses above preferably have a size of 800 mm×1,000 mm.

Thus, when the radiation-shielding glass is used for a gamma-ray shielding window for medical uses and a gamma-ray shielding protection screen for medical uses, the visibility of the glass can be increased. Thus, the medial conditions of the subject can be easily observed by a doctor, a laboratory technician, a nurse, or the like who carrying out the PET examination. In addition, if the length and width of the shielding surface of the radiation-shielding glass for medical uses is 800 mm×1,000 mm or more, gamma rays generated from positron nuclide with higher radiation permeability than X-rays can be effectively shielded. Thus, a doctor, a laboratory technician, a nurse, or the like who performs the PET examination can be effectively prevented from a situation of being cumulatively exposed to radiation and suffered from the radiation more than a safety level. In particular, it is more preferable in the case of using a gamma-ray shielding protection screen for the PET examination, because there is a high demand for the use of the gamma-ray shielding protection screen in a state that the distance between a subject and a doctor or the like is short, with the protection screen interposed therebetween, while avoiding radiation exposure.

As a radiation-shielding glass article including the above radiation-shielding glass, it is preferable to include a single plate glass formed of the radiation-shielding glass.

Thus, there is no need of employing a method of enhancing the radiation-shielding ability of the glass by performing a lamination process or the like to attach a plurality of thin glass plates on top of one another. Thus, the production can be facilitated. Further, the steps are few and a problem in cost increasing or the like due to the soaring material costs is not caused. As a result, it becomes possible to greatly contribute to lower the costs of all the radiation-shielding glass articles. Note that depending on purposes, the surface of the glass plate may be provided with any of various functional films.

On the other hand, a method of manufacturing the radiation-shielding glass described above includes a step of obtaining molten glass by melting a glass material in a melting furnace, where the molten glass has a melting temperature of 1,400° C. or less.

In other words, when the melting temperature of molten glass is higher than 1,400° C. in a method for manufacturing such a kind of radiation-shielding glass, the glass tends to be colored even if the contents of impurities, $Fe_2O_3$ and $Cr_2O_3$, are small. Besides, an environmental load becomes large and leads to the soaring of energy costs, so a disadvantage of increased production costs occurs. However, if the molten glass has a melting temperature of 1,400° C. or lower, such a disadvantage can be effectively avoided. From this viewpoint, the melting temperature is more preferably 1,350° C. or lower or 1,300° C. or lower, still more preferably 1,250° C. or lower or 1,200° C. or lower.

Further, as a method of forming radiation-shielding glass described above, various forming methods are known in the art, including a roll out method, a float method, a slot down draw method, an overflow down draw method, a redraw method, and the like. Any of them may be suitably selected. In particular, the radiation-shielding glass described above is preferably formed by the roll out method. The roll out method efficiently produces a plate glass with a large plate thickness and the molten glass can be formed quickly. Thus, the glass can hardly cause the devitrification at the time of formation, so the plate glass with a large plate thickness can be more efficiently obtained.

As a method of manufacturing radiation-shielding glass, it is preferable to further include a step of setting a theoretical plate thickness value, including: calculating an effective dose build-up factor for the radiation based on a glass composition and a density of a glass plate to be formed before a step of forming a glass plate from a molten glass; calculating an effective dose transmission of the glass plate to be formed for the radiation by multiplying the effective dose build-up factor by a transmission when the radiation is perpendicularly incident on the glass plate to be formed; and setting the theoretical plate thickness value of the glass to be formed based on the effective dose transmission.

Thus, an advantage of using an effective dose build-up factor to set the theoretical plate thickness value of a glass plate to be formed is already described, so the description thereof will be omitted herein.

In this case, in the step of setting the theoretical plate thickness value, the theoretical plate thickness value is preferably set by making a comparison between an effective dose transmission of lead obtained based on an effective dose build-up factor of lead against the radiation and an effective dose transmission of the glass plate to be formed.

Thus, an advantage by setting the theoretical plate thickness value of the glass plate to be formed based on lead whose shielding ability against radiation has been demonstrated is also already described, so the description thereof will be omitted herein.

Note that the method of manufacturing a radiation-shielding glass for medical uses and the radiation-shielding glass for medical uses according to the present invention may have the following configuration as a basic feature. In other words, the method of manufacturing radiation-shielding glass for medical uses may have a basic feature of calculating an effective dose build-up factor for radiation based on the glass composition and the density of the glass plate to be formed before the step of forming a glass plate, calculating an effective dose transmission of the glass plate to be formed for the radiation by multiplying the effective dose build-up factor by a transmission when the radiation is perpendicularly incident on the glass plate to be formed, and setting the theoretical plate thickness value of the glass plate to be formed based on the effective dose transmission. The radiation-shielding glass for medical uses may have a basic feature where the glass is a glass plate having a plate thickness equal to or larger than the theoretical plate thickness value of the glass.

EFFECTS OF THE INVENTION

As described above, according to the radiation-shielding glass of the present invention corresponding to the first object, the glass composition includes 55% or more of PbO, so the radiation-shielding ability of the glass can be considerably enhanced. Besides, the total light transmission at a wavelength of 400 nm at a thickness of 10 mm is 50% or more, so appropriate transparency can be ensured to attain sufficient visibility.

In addition, according to the radiation-shielding glass of the present invention corresponding to the second object, a desired base material having sufficient gamma-ray shielding performance and sufficient visibility can be obtained as a gamma-ray shielding material for use in PET examination. Thus, in the field of the PET examination, it becomes possible to prevent an examiner such as a doctor from directly being exposed to gamma rays radiated from a subject with administration of a diagnostic drug, while effectively avoiding a misdiagnosis or the like when a doctor or the like confirms the complexion or the like of the subject.

BRIEF DESCRIPTION OF THE DRAWINGS

FIG. 2(A) is an explanatory diagram in a case where radiation emitted from a radiation source is a narrow beam and FIG. 2(B) is an explanatory diagram in a case where radiation is emitted to all angles.

Figure 1:
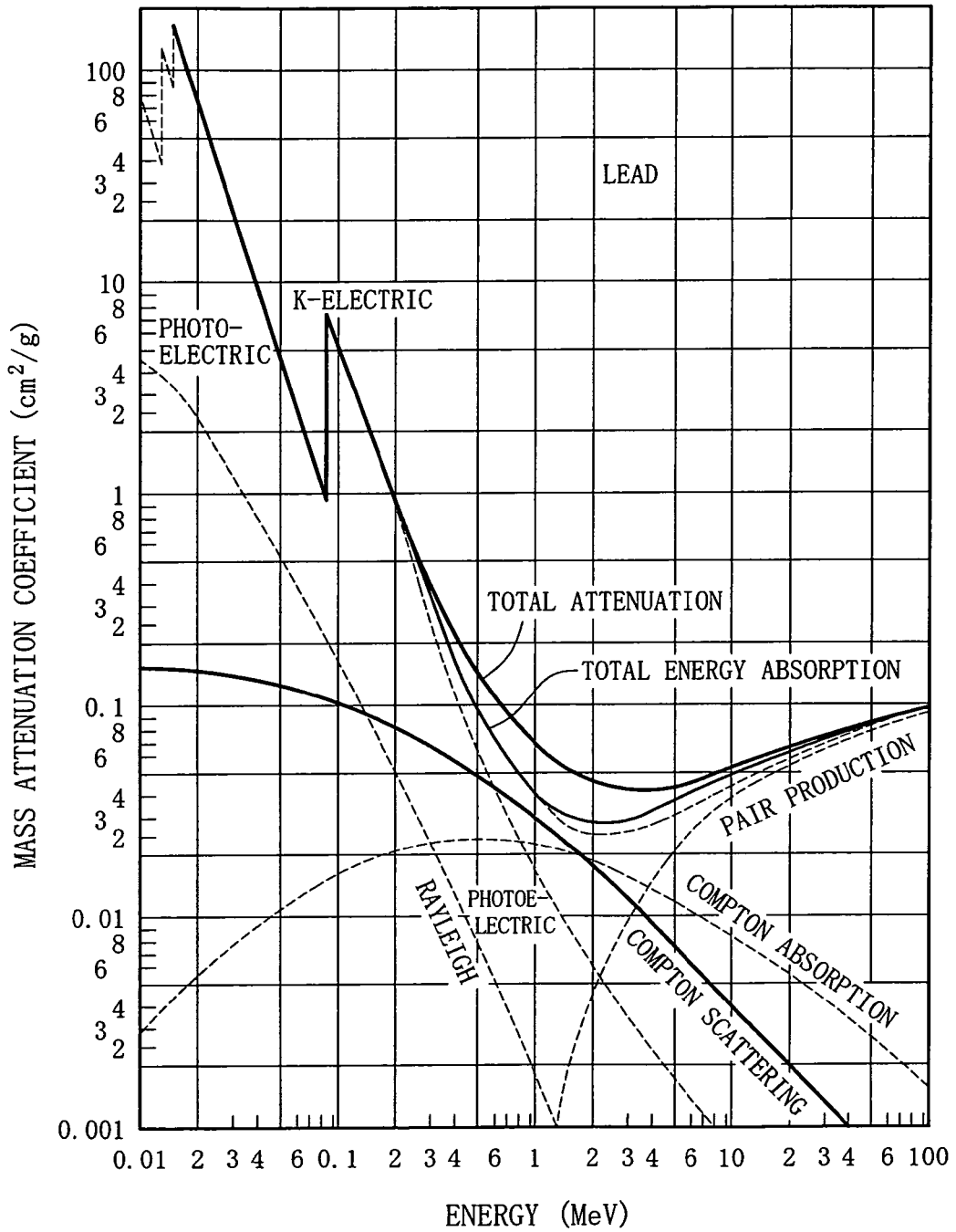
FIG. 1 is a graph illustrating a relationship between an energy and a mass attenuation coefficient of lead.
Figure 2A:
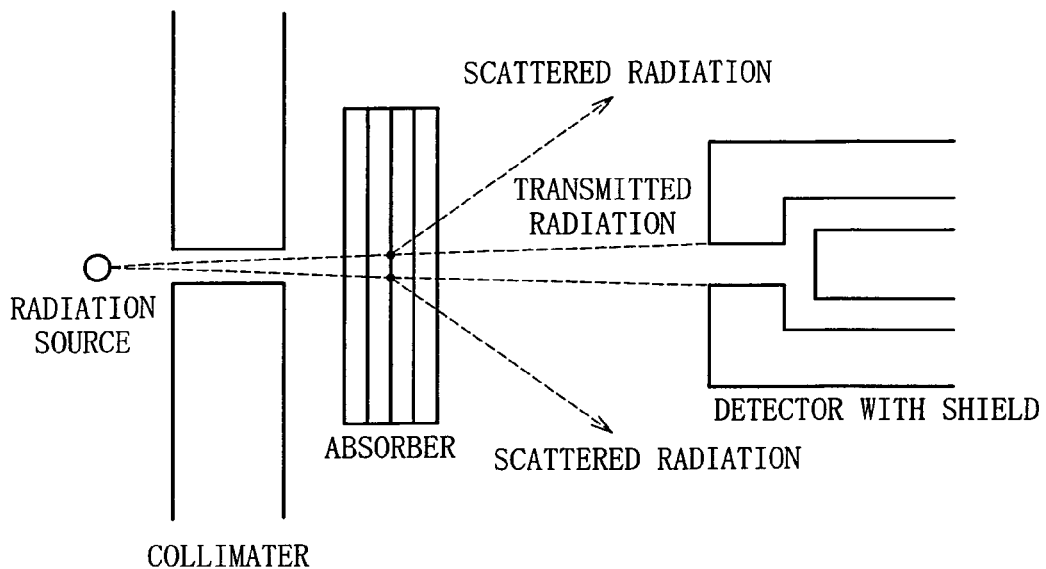
FIG. 2(A) and FIG. 2(B) are explanatory diagrams illustrating behaviors of gamma rays with different configurations of radiation sources, where
Figure 2B:
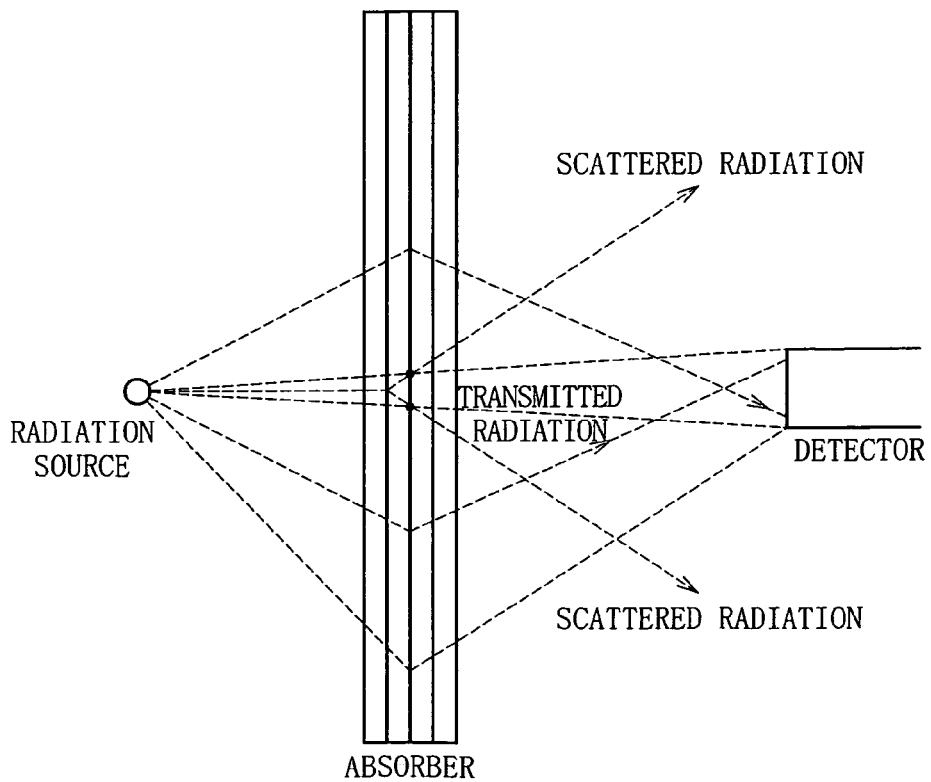

| Description of Reference Numerals | |
|---|---|
| 1 | melting furnace |
| 2 | molten glass |
| 3 | forming roll |
| 4 | glass ribbon |
| 5 | transfer roll |

BEST MODE FOR CARRYING OUT THE INVENTION

Hereinafter, the embodiments of the present invention will be described.

The radiation-shielding glass according to the present embodiment includes a glass composition in % by mass of 10 to 35% $SiO_2$, 55 to 80% PbO, 0 to 10% $B_2O_3$, 0 to 10% $Al_2O_3$, 0 to 10% SrO, 0 to 10% BaO, 0 to 10% $Na_2O$, and 0 to 10% $K_2O$. The radiation-shielding glass has a total light transmission at a wavelength of 400 nm at a thickness of 10 mm of 50% or more and is used for a gamma-ray shielding material for a PET examination. Further, the clarifier includes $Sb_2O_3$ or $Cl_2$ but substantially does not contain $As_2O_3$ which is harmful to the environment. Further, the content of $Fe_2O_3$ and $Cr_2O_3$, which are impurities, are 200 ppm or less and 50 ppm or less, respectively.

The reasons for limiting the basic composition of the glass as described above will be described below.

$SiO_2$ is a component forming the network of the glass. The content thereof is 10 to 35%, preferably 10 to 30%, more preferably 20 to 30%. If the content of $SiO_2$ exceeds 35%, the high-temperature viscosity of the glass is increased. As a result, it becomes difficult to melt and form the glass and the radiation-shielding ability of the glass is decreased. In contrast, if the content of $SiO_2$ is less than 10%, the amount of a component forming the skeleton of the glass becomes too small. As a result, the glass becomes thermally unstable and the water resistance of the glass is decreased.

PbO is a component for shielding against radiation. The content of PbO is 55 to 80%, preferably 60 to 80%, more preferably 65 to 80%, and still more preferably 70% to 80%. If the content of PbO exceeds 80%, the contents of components other than PbO becomes relatively small and the glass is made thermally unstable. On the other hand, if the content of PbO is 50% or less, the radiation-shielding ability of the glass is decreased.

$B_2O_3$ is a component that lowers the high-temperature viscosity of the glass to enhance melting property and formability and also heightens the thermal stability of the glass. The content of $B_2O_3$ is 0 to 10%, preferably 0.1 to 8%, and more preferably 0.1 to 5%. If the content of $B_2O_3$ exceeds 10%, the water resistance of the glass is decreased.

$Al_2O_3$ is a component that enhances the thermal stability of the glass. The content of $Al_2O_3$ is 0 to 10%, preferably 0.1 to 8%, and more preferably 0.1 to 5%. If the content of $Al_2O_3$ exceeds 10%, the high-temperature viscosity of the glass is increased. As a result, it becomes difficult to melt and form the glass and the radiation-shielding ability of the glass is decreased.

SrO and BaO are components for adjusting the viscosity and the devitrification of the glass and enhancing the radiation-shielding ability thereof. The content of each of SrO and BaO is 0 to 10%, preferably 0 to 8%, and more preferably 0 to 5%. If the content of SrO or BaO exceeds 10%, the glass becomes thermally unstable.

$Na_2O$ and $K_2O$ are components that lower the high-temperature viscosity of the glass while enhancing the melting property and the formability of the glass. The content of each of $Na_2O$ and $K_2O$ is 0 to 10%, preferably 0 to 8%, and more preferably 1 to 5%. If the content of $Na_2O$ or $K_2O$ exceeds 10%, the radiation-shielding ability of the glass is decreased.

$Sb_2O_3$ is a component that acts as a clarifier. The content of $Sb_2O_3$ is 100 to 20,000 ppm (preferably 200 to 20,000 ppm, 500 to 20,000 ppm, 1,000 to 20,000 ppm, more than 5,000 to 20,000 ppm, 5,500 to 20,000 ppm, 6,000 to 20,000 ppm). If the content of $Sb_2O_3$ is less than 100 ppm, clarification ability can be hardly obtained and foam in the glass can be hardly reduced. Further, if the content of $Sb_2O_3$ exceeds 20,000 ppm, an increase in raw material costs occurs because $Sb_2O_3$ is expensive.

$Cl_2$ is a component that acts as a clarifier. The content of $Cl_2$ is 0 to 20,000 ppm, preferably 200 to 20,000 ppm, more preferably 500 to 20,000 ppm, and still more preferably 1,000 to 10,000 ppm. If the content of $Cl_2$ exceeds 20,000 ppm, an excess volatilization volume of $Cl_2$ facilitates deterioration of the glass. Note that the content of $Cl_2$ indicates the remaining amount of $Cl_2$ in the glass.

$Sb_2O_3$ used as a clarifier in the present embodiment generates a significant amount of clear gas (oxygen gas) as a result of a chemical reaction due to a change in ionic valency in the temperature range of 900° C. or more. In particular, a significant amount of clear gas is generated at low temperature of 1,000 to 1,200° C. Further, $Cl_2$ decomposes and then vaporizes at a temperature range of 900° C. or higher, thereby generating clear gas (e.g., chlorine gas). Therefore, a high clarification effect can be obtained when $Sb_2O_3$ or $Cl_2$ is used as a clarifier even if a temperature ranging from the temperature at the time of vitrification reaction to the temperature at the time of homogenization melting is of low temperatures. Thus, a radiation-shielding glass without coloring and foam can be efficiently obtained.

Note that any of other components can be added up to 10% as far as it does not impair the properties of the glass.

4 is transferred by a plurality of transfer rolls 5 while being cooled, thereby forming a plate glass. Subsequently, the plate glass is finally provided as the radiation-shielding glass.

EXAMPLES

As Examples 1 to 24 of the present invention, 24 kinds of glass compositions of radiation-shielding glasses (gamma-ray shielding glass) for medical uses, particularly for the PET examination, were subjected to the measurements of density, gamma-ray attenuation coefficient, strain point, liquidus temperature, liquidus viscosity, and transmission (total light transmission at a wavelength of 400 nm at a thickness of 10 mm). The results are shown in Table 1 below.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Glass composition (% by mass) | $SiO_2$ | 26 | 27.1 | 24 | 26.5 | 25 | 24 | 25 | 24 | 27.6 | 24.6 | 27.6 | 20 |
| | PbO | 71.7 | 71.7 | 71.7 | 71.7 | 71.7 | 71.7 | 71.7 | 71.7 | 68 | 68 | 68 | 71.7 |
| | $B_2O_3$ | 1.2 | — | 3.2 | 1.2 | 1.2 | 1.2 | 1.2 | 1.2 | 1.2 | 1.2 | 1.2 | 1.2 |
| | $Al_2O_3$ | — | — | — | — | 1 | 2 | — | — | — | — | — | 5 |
| | SrO | — | — | — | — | — | — | — | — | 2 | 5 | — | — |
| | BaO | — | — | — | — | — | — | 1 | 2 | — | — | 2 | — |
| | $Na_2O$ | — | — | — | — | — | — | — | — | — | — | — | 1 |
| | $K_2O$ | 0.5 | 0.5 | 0.5 | — | 0.5 | 0.5 | 0.5 | 0.5 | 0.5 | 0.5 | 0.5 | 0.5 |
| | $Sb_2O_3$ | 0.6 | 0.6 | 0.5 | 0.6 | 0.6 | 0.4 | 0.6 | 0.6 | 0.6 | 0.6 | 0.6 | 0.5 |
| | Cl | — | 0.1 | 0.1 | — | — | 0.2 | — | — | 0.1 | 0.1 | 0.1 | 0.1 |
| Density($g/cm^3$) | | 5.24 | 5.23 | 5.26 | 5.23 | 5.25 | 5.26 | 5.31 | 5.39 | 5.05 | 5.26 | 5.06 | 5.33 |
| Gamma-ray attenuation coefficient($cm^{-1}$) | | 0.67 | 0.66 | 0.67 | 0.66 | 0.67 | 0.67 | 0.68 | 0.69 | — | — | — | 0.67 |
| strain point(° C.) | | 386 | 401 | 380 | 393 | 393 | 399 | 384 | 381 | 409 | 412 | 403 | 398 |
| Liquidus temperature (° C.) | | 620 | 645 | 550 | 700 | 630 | 690 | 620 | 615 | — | — | — | — |
| Liquidus viscosity (dPa·s) | | 5.4 | 5.5 | 6.3 | 4.3 | 5.3 | 4.5 | 5.2 | 5.1 | — | — | — | — |
| Transmission(%) | | 70 | 75 | 65 | 70 | 75 | 75 | 75 | 75 | 70 | 70 | 70 | 60 |

| | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Glass composition (% by mass) | $SiO_2$ | 20 | 20.8 | 20.6 | 20 | 25.3 | 21.3 | 21.3 | 20.3 | 20.8 | 21.3 | 20.8 | 20.8 |
| | PbO | 71.7 | 70 | 69 | 70 | 68 | 68 | 65 | 65 | 65 | 73 | 75 | 75 |
| | $B_2O_3$ | 1.2 | 4 | 7 | 9 | 3 | 3 | 2 | 1 | — | 2 | 1 | 1 |
| | $Al_2O_3$ | 3 | 4 | 3 | 0.5 | — | 2 | 1 | 2 | 5 | 1 | 1 | 1 |
| | SrO | 1 | — | — | — | — | 1 | 2.5 | 2 | 1 | — | 1 | — |
| | BaO | 1 | — | — | — | — | 1 | 2.5 | 3 | 1.5 | — | — | 1 |
| | $Na_2O$ | 1 | — | — | — | 2 | 2 | 2 | 3 | 5 | 1 | — | — |
| | $K_2O$ | 0.5 | 0.5 | — | — | 1 | 1 | 3 | 3 | 1 | 1 | 0.5 | 0.5 |
| | $Sb_2O_3$ | 0.5 | 0.6 | 0.3 | 0.4 | 0.6 | 0.6 | 0.6 | 0.6 | 0.6 | 0.6 | 0.6 | 0.6 |
| | Cl | 0.1 | 0.1 | 0.1 | 0.1 | 0.1 | 0.1 | 0.1 | 0.1 | 0.1 | 0.1 | 0.1 | 0.1 |
| Density($g/cm^3$) | | 5.47 | 5.13 | 5.03 | 5.01 | 5.13 | 5.14 | 5.08 | 5.04 | 5.00 | 5.40 | 5.63 | 5.64 |
| Gamma-ray attenuation coefficient($cm^{-1}$) | | 0.69 | 0.64 | 0.63 | 0.63 | 0.64 | 0.64 | 0.63 | 0.62 | 0.61 | 0.69 | 0.72 | 0.72 |
| strain point(° C.) | | 380 | 396 | 393 | 360 | 404 | 364 | 358 | 352 | 394 | 355 | 379 | 376 |
| Liquidus temperature (° C.) | | — | — | — | — | — | 650 | — | — | — | 620 | 640 | 660 |
| Liquidus viscosity (dPa·s) | | — | 3.9 | — | — | — | 4.0 | — | — | — | 4.3 | 4.4 | 4.0 |
| Transmission(%) | | 60 | 65 | 75 | 80 | 75 | 70 | 75 | 60 | 50 | 60 | 65 | 65 |

When the radiation-shielding glass of the present embodiment is prepared, a plate glass is formed by the roll out method in the process of melting a glass material in a melting furnace to obtain a molten glass and then forming the molten glass into a plate glass.

Figure 3:
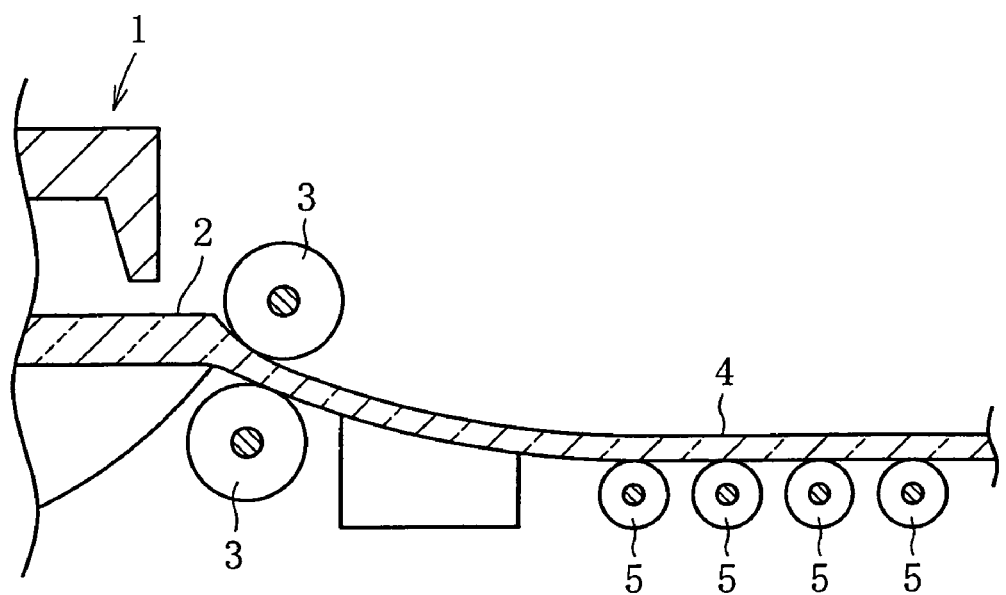
FIG. 3 is a schematic diagram representing the situation of carrying out a roll out method employed in one of the steps in a method of manufacturing radiation-shielding glass in accordance with an embodiment of the present invention.

Here, the roll out method will be described in detail. As shown in FIG. 3, a molten glass 2 molten in a melting furnace 1 is passed through the gap between a pair of forming rolls 3 to form a strip-shaped glass ribbon 4. Then, the glass ribbon First, raw materials were prepared to obtain glass having a composition shown in Table 1 and a prepared batch was then placed in a quartz crucible, followed by melting at 1,150° C. for 1 hour as shown in Table 1. Subsequently, the molten glass was poured on a carbon plate to be formed into a plate shape. After gradually cooling, sample glass for each evaluation was prepared.

The respective samples thus obtained were shown in Table 1 in terms of density, transmission, and the like with respect to 24 different glass compositions. It should be noted that in Table 1, the values of the density, transmission, and the like represented by the symbol "–" means unmeasured values.

The density was determined by the well-known Archimedes method.

The gamma-ray attenuation coefficient of gamma-ray energy (0.511 Mev) was calculated by calculation from the data of Photx.

In addition, the strain point was measured based on ASTM C336-71. Note that the higher strain point is favorable and it can suppress thermal deformation and thermal shrinkage of a glass substrate in the heat process.

The liquidus temperature was measured as follows. A well-washed powdery sample of 300 to 500 μm in size was placed in a platinum boat and then held in an electric furnace having a temperature gradient of 800 to 500° C. for 48 hours, followed by cooling in the air. Then, the temperature at which a crystal began to deposit in the glass was measured as the liquidus temperature of the glass.

The liquidus viscosity was determined by creating a viscosity curve from viscosity obtained by the platinum pulling-up method and calculating the viscosity of glass which is equivalent to liquidus temperature from the viscosity curve.

The measurement of transmission was performed using Spectrophotometer UV-2500 PC, manufactured by Shimadzu Corporation. A measured wavelength was 380 to 700 nm, a measurement speed (scan speed) was a low speed, a slit width was 5 nm, and a sampling pitch was 1 nm (that is, measurement was conducted at intervals of 1 nm).

As is evident from Table 1, the transmission of the radiation-shielding glasses of Examples 1 to 24 were in the range of 50% to 80%. Most of those had transmission of 65% to 75%, having proper transparency.

As Examples 25 to 30 of the present invention, 6 kinds of glass compositions of radiation-shielding glasses (gamma-ray shielding glass) for the PET examination were subjected to the measurements of density, thermal expansion coefficient α, strain point, liquidus temperature, liquidus viscosity, gamma-ray attenuation coefficient, chromaticity, and melting temperature. The results are shown in Table 2 below. In addition, the Comparative Examples 1 to 3 4-are shown in Table 3 below.

TABLE 3

| | | Comparative Example | | |
|---|---|---|---|---|
| | | 1 | 2 | 3 |
| Glass | $SiO_2$ | 26.0 | 26.0 | 26.0 |
| composition | PbO | 71.7 | 71.7 | 71.7 |
| (% by mass) | $B_2O_3$ | 1.2 | 1.2 | 1.2 |
| | $Al_2O_3$ | — | — | — |
| | BaO | — | — | — |
| | $K_2O$ | 0.5 | 0.5 | 0.5 |
| | $Sb_2O_3$ | 0.6 | 0.6 | 0.6 |
| Impurity | $Fe_2O_3$ | 250 | 210 | 210 |
| (ppm) | $Cr_2O_3$ | 0.2 | 0.2 | 20 |
| Density(g/cm$^3$) | | 5.24 | 5.24 | 5.24 |
| α (×10$^{-7}$/° C.) | | 82 | 82 | 82 |
| strain point(° C.) | | 385 | 385 | 385 |
| Liquidus temperature(° C.) | | 620 | 620 | 620 |
| Liquidus viscosity(dPa · s) | | 5.4 | 5.4 | 5.4 |
| Gamma-ray attenuation coefficient at 0.511 MeV (cm$^{-1}$) | | 0.67 | 0.67 | 0.67 |
| Chromaticity | X coordinate | 0.3300 | 0.3275 | 0.3290 |
| | Y coordinate | 0.3560 | 0.3500 | 0.3570 |
| Evaluation of chromaticity | | X | X | X |
| Melting temperature | | 1150 | 1150 | 1150 |

First, raw materials were prepared to obtain glass having a composition shown in Tables 2 and 3 and a prepared batch was then placed in a quartz crucible, followed by melting at each temperature shown in Tables 2 and 3 for 1 hour. Subsequently, the molten glass was poured on a carbon plate to be formed into a plate shape. After gradually cooling, sample glass for each evaluation was prepared.

The respective samples thus obtained were shown in Tables and 3 in terms of density, melting temperature, and the like with respect to 6 kinds of glass compositions.

The density was determined by the well-known Archimedes method.

For the thermal expansion coefficient α, a cylindrical sample of 5.0 mm in diameter and 20 mm in length was prepared and then an average thermal expansion coefficient at 30 to 380° C. was measured by a dilatometer.

In addition, the strain point was measured based on ASTM C336-71. Note that the higher strain point is favorable and it

TABLE 2

| | | Example | | | | | |
|---|---|---|---|---|---|---|---|
| | | 25 | 26 | 27 | 28 | 29 | 30 |
| Glass | $SiO_2$ | 26.0 | 27.1 | 24.0 | 26.5 | 25.0 | 24.0 |
| composition | PbO | 71.7 | 71.7 | 71.7 | 71.7 | 71.7 | 71.7 |
| (% by mass) | $B_2O_3$ | 1.2 | — | 3.2 | 1.2 | 1.2 | 1.2 |
| | $Al_2O_3$ | — | — | — | — | 1.0 | 2.0 |
| | BaO | — | — | — | — | — | — |
| | $K_2O$ | 0.5 | 0.5 | 0.5 | — | 0.5 | 0.5 |
| | $Sb_2O_3$ | 0.6 | 0.6 | 0.6 | 0.6 | 0.6 | 0.6 |
| Impurity | $Fe_2O_3$ | 20 | 120 | 20 | 20 | 20 | 70 |
| (ppm) | $Cr_2O_3$ | 0.2 | 0.2 | 10 | 50 | 1.0 | 0.2 |
| Density(g/cm$^3$) | | 5.24 | 5.23 | 5.26 | 5.23 | 5.25 | 5.26 |
| α (×10$^{-7}$/° C.) | | 82 | 83 | 84 | 79 | 81 | 80 |
| strain point(° C.) | | 385 | 400 | 380 | 395 | 395 | 400 |
| Liquidus temperature(° C.) | | 620 | 645 | 550 | 700 | 630 | 690 |
| Liquidus viscosity(dPa · s) | | 5.4 | 5.5 | 6.3 | 4.3 | 5.3 | 4.5 |
| Gamma-ray attenuation coefficient at 0.511 MeV (cm$^{-1}$) | | 0.67 | 0.66 | 0.67 | 0.66 | 0.67 | 0.67 |
| Chromaticity | X coordinate | 0.3114 | 0.3206 | 0.3124 | 0.3149 | 0.3120 | 0.3167 |
| | Y coordinate | 0.3185 | 0.3366 | 0.3239 | 0.3348 | 0.3194 | 0.3270 |
| Evaluation of chromaticity | | ○ | ○ | ○ | ○ | ○ | ○ |
| Melting temperature | | 1150 | 1150 | 1150 | 1150 | 1150 | 1150 | can suppress thermal deformation and thermal shrinkage of a glass substrate in the heat process.

The liquidus temperature was measured as follows. A well-washed powdery sample of 300 to 500 μm in size was placed in a platinum boat and then held in an electric furnace having a temperature gradient of 800 to 500° C. for 48 hours, followed by cooling in the air. Then, the temperature at which a crystal began to deposit in the glass was measured as the liquidus temperature of the glass. The liquidus viscosity was determined by creating a viscosity curve from viscosity obtained by the platinum pulling-up method and calculating the viscosity of glass which is equivalent to liquidus temperature from the viscosity curve.

The gamma-ray attenuation coefficient of gamma-ray energy (0.511 Mev) was calculated by calculation from the data of Photx.

The chromaticity was measured and evaluated as follows. A measurement sample was a mirror polished sample glass with dimensions of 20 mm×30 mm×10 mm thickness. The measurement sample was subjected to the measurement of transmission at intervals of 1 nm using Spectrophotometer UV-2500 PC, manufactured by Shimadzu Corporation. The chromaticity was determined under the conditions in which a measured wavelength was 380 to 700 nm, a measurement speed was a low speed, a slit width was 5 nm, and a radiation source was C. When the chromaticity for the C light source calculated from a total light transmission of 380 to 700 nm was in the region surrounded by X and Y coordinates (X, Y)=(0.3101, 0.3160), (0.3250, 0.3160), (0.3250, 0.3400), and (0.3101, 0.3400) was represented by "○" and the chromaticity out of the region was represented by "×".

As is evident from Table 2, the radiation-shielding glass of the present invention showed a gamma-ray attenuation coefficient of 0.66 cm$^{-1}$ or more at 0.511 MeV, thereby having a good radiation-shielding ability. In addition, it showed good color tone.

On the other hand, as is evident from Table 3, the radiation-shielding glass of Comparative Example 1 resulted in poor glass transparency, because $Fe_2O_3$ content was 250 ppm and the chromaticity had coordinates of (X, Y)=(0.3300, 0.3560). The radiation-shielding glass of Comparative Example 2 resulted in poor glass transparency, because $Fe_2O_3$ content was 210 ppm and the chromaticity had coordinates of (X, Y)=(0.3275, 0.3550). The radiation-shielding glass of Comparative Example 3 resulted in poor glass transparency, because $Fe_2O_3$ content was 210 ppm, $Cr_2O_3$ content was 20 ppm, and the chromaticity had coordinates of (X, Y)=(0.329, 0.3570). The radiation-shielding glass of each of Comparative Examples 1 to 3 shown in Table 3 had a transmission of less than 50%.

As Examples 31 to 38 of the present invention, 8 kinds of glass compositions of radiation-shielding glasses (gamma-ray shielding glass) for the PET examination were subjected to the measurements of density, thermal expansion coefficient α, strain point, liquidus temperature, liquidus viscosity, gamma-ray attenuation coefficient, chromaticity, foam, and melting temperature. The results are shown in Table 4 below. In addition, the Comparative Examples 4 to 6 are shown in Table 5 below.

As Examples 31 to 38 of the present invention, 8 kinds of glass compositions of radiation-shielding glasses (gamma-ray shielding glass) for the PET examination were subjected to the measurements of density, thermal expansion coefficient α, strain point, liquidus temperature, liquidus viscosity, gamma-ray attenuation coefficient, chromaticity, foam, and melting temperature. The results are shown in Table 4 below. In addition, the Comparative Examples 5 to 7 are shown in Table 5 below.

TABLE 4

| | | Example | | | | | | | |
|---|---|---|---|---|---|---|---|---|---|
| | | 31 | 32 | 33 | 34 | 35 | 36 | 37 | 38 |
| Glass composition (% by mass) | $SiO_2$ | 26.0 | 27.1 | 24.0 | 26.5 | 25.0 | 24.0 | 25.0 | 24.0 |
| | PbO | 71.7 | 71.7 | 71.7 | 71.7 | 71.7 | 71.7 | 71.7 | 71.7 |
| | $B_2O_3$ | 1.2 | — | 3.2 | 1.2 | 1.2 | 1.2 | 1.2 | 1.2 |
| | $Al_2O_3$ | — | — | — | — | 1.0 | 2.0 | — | — |
| | BaO | — | — | — | — | — | — | 1.0 | 2.0 |
| | $Na_2O$ | — | — | — | — | — | — | — | — |
| | $K_2O$ | 0.5 | 0.5 | 0.5 | — | 0.5 | 0.5 | 0.5 | 0.5 |
| | $Sb_2O_3$ | 0.6 | 0.6 | 0.5 | 0.6 | 0.6 | 0.4 | 0.6 | 0.6 |
| | $Cl_2$ | — | 0.1 | 0.1 | — | — | 0.2 | — | — |
| Density(g/cm$^3$) | | 5.24 | 5.23 | 5.26 | 5.23 | 5.25 | 5.26 | 5.31 | 5.39 |
| α (×10$^{-7}$/° C.) | | 82 | 83 | 84 | 79 | 81 | 80 | 85 | 87 |
| strain point(° C.) | | 385 | 400 | 380 | 395 | 395 | 400 | 385 | 380 |
| Liquidus temperature(° C.) | | 620 | 645 | 550 | 700 | 630 | 690 | 620 | 615 |
| Liquidus viscosity(dPa · s) | | 5.4 | 5.5 | 6.3 | 4.3 | 5.3 | 4.5 | 5.2 | 5.1 |
| Gamma-ray attenuation coefficient at 0.511 MeV (cm$^{-1}$) | | 0.67 | 0.66 | 0.67 | 0.66 | 0.67 | 0.67 | 0.68 | 0.69 |
| Color tone | | ○ | ○ | ○ | ○ | ○ | ○ | ○ | ○ |
| Foam | | ○ | ○ | ○ | ○ | ○ | ○ | ○ | ○ |
| Melting temperature | | 1150 | 1150 | 1150 | 1150 | 1150 | 1150 | 1150 | 1150 |

TABLE 5

| | | Comparative Example | | |
|---|---|---|---|---|
| | | 4 | 5 | 6 |
| Glass composition (% by mass) | $SiO_2$ | 26.0 | 27.1 | 52.0 |
| | PbO | 71.7 | 71.7 | 33.0 |
| | $B_2O_3$ | 1.2 | — | — |
| | $Al_2O_3$ | — | — | 0.5 |
| | BaO | — | — | — |
| | $Na_2O$ | — | — | 7.0 |
| | $K_2O$ | 0.5 | 0.5 | 7.0 |
| | $CeO_2$ | — | — | 0.5 |
| | $Sb_2O_3$ | — | — | — |
| | $Cl_2$ | — | 0.1 | — |
| | $As_2O_3$ | — | 0.6 | — |
| | $SnO_2$ | 0.6 | — | — |

TABLE 5-continued

|  | Comparative Example | | |
|---|---|---|---|
|  | 4 | 5 | 6 |
| Density(g/cm$^3$) | 5.24 | 5.23 | 3.24 |
| α (×10$^{-7}$/° C.) | 82 | 83 | 100 |
| strain point (° C.) | 385 | 400 | 370 |
| Liquidus temperature(° C.) | 620 | 645 | Not measurement |
| Liquidus viscosity (dPa · s) | 5.4 | 5.5 | Not measurement |
| Gamma-ray attenuation coefficient at 0.511 MeV (cm$^{-1}$) | 0.67 | 0.66 | 0.34 |
| Color tone | ○ | X | ○ |
| Foam | X | ○ | ○ |
| Melting temperature | 1150 | 1450 | 1150 |

First, raw materials were prepared to obtain glass having a composition shown in Tables 4 and 5 and a prepared batch was then placed in a quartz crucible, followed by melting at each temperature shown in Tables 4 and 5 for 1 hour. Subsequently, the molten glass was poured on a carbon plate to be formed into a plate shape. After gradually cooling, sample glass for each evaluation was prepared.

For each of the samples thus obtained, density, thermal expansion coefficient, liquidus temperature, liquidus viscosity, gamma-ray attenuation coefficient at gamma-ray energy (0.511 Mev), color tone, foam, and melting temperature are shown in Tables 4 and 5.

The density was determined by the well-known Archimedes method.

For the thermal expansion coefficient α, a cylindrical sample of 5.0 mm in diameter and 20 mm in length was prepared and then an average thermal expansion coefficient at 30 to 380° C. was measured by a dilatometer.

In addition, the strain point was measured based on ASTM C336-71. Note that the higher strain point is favorable and it can suppress thermal deformation and thermal shrinkage of a glass substrate in the heat process.

The liquidus temperature was measured as follows. A well-washed powdery sample of 300 to 500 μm in size was placed in a platinum boat and then held in an electric furnace having a temperature gradient of 800 to 500° C. for 48 hours, followed by cooling in the air. Then, the temperature at which a crystal began to deposit in the glass was measured as the liquidus temperature of the glass. The liquidus viscosity was determined by creating a viscosity curve from viscosity obtained by the platinum pulling-up method and calculating the viscosity of glass which is equivalent to liquidus temperature from the viscosity curve.

The gamma-ray attenuation coefficient of gamma-ray energy (0.511 MeV) was calculated by calculation from the data of Photx.

For the color tone of the glass, formed glass was subjected to mirror polishing to have a thickness of 10 mm and the degree of coloring was then confirmed visually, followed by the measurement of transmission at 380 to 700 nm using Spectrophotometer UV-2500 PC, manufactured by Shimadzu Corporation. A transmission of 80% or more was represented by "○" and a transmission of less than 80% was represented by "×".

The foam in the glass was evaluated using a stereoscopic microscope (×100). The foamless glass was represented by "○" and the foam-detected glass was represented by "×".

As is evident from Table 4, the radiation-shielding glass of the present invention showed a gamma-ray attenuation coefficient of 0.66 cm$^{-1}$ or more at 0.511 MeV, thereby having a good radiation-shielding ability. In addition, it showed good color tone and good foam quality.

In contrast, as is evident from Table 5, the radiation-shielding glass of Comparative Example 4 showed poor foam quality. In addition, the radiation-shielding glass of Comparative Example 5 using As$_2$O$_3$ as a clarifier and showed a high melting temperature of 1,450° C., thereby resulting in colored glass. The radiation-shielding glass of Comparative Example 6 had a small PbO content of 33.0%, so it showed a small gamma-ray attenuation coefficient of 0.34 cm$^{-1}$ at gamma-ray energy of 0.511 Mev, thereby resulting in poor radiation-shielding ability.

As Examples 39 to 46 of the present invention, 8 kinds of glass compositions of radiation-shielding glasses (gamma-ray shielding glass) for the PET examination were subjected to the measurements of density, thermal expansion coefficient a, strain point, liquidus temperature, liquidus viscosity, and gamma-ray attenuation coefficient. The results are shown in Table 6 below. In addition, the Comparative Examples 7 and 8 are shown in Table 7 below.

TABLE 6

|  |  | Example | | | | | | | |
|---|---|---|---|---|---|---|---|---|---|
|  |  | 39 | 40 | 41 | 42 | 43 | 44 | 45 | 46 |
| Glass composition (% by mass) | SiO$_2$ | 26.0 | 27.1 | 24.0 | 26.5 | 25.0 | 24.0 | 25.0 | 24.0 |
|  | PbO | 71.7 | 71.7 | 71.7 | 71.7 | 71.7 | 71.7 | 71.7 | 71.7 |
|  | B$_2$O$_3$ | 1.2 | — | 3.2 | 1.2 | 1.2 | 1.2 | 1.2 | 1.2 |
|  | Al$_2$O$_3$ | — | — | — | — | 1.0 | 2.0 | — | — |
|  | BaO | — | — | — | — | — | — | 1.0 | 2.0 |
|  | Na$_2$O | — | — | — | — | — | — | — | — |
|  | K$_2$O | 0.5 | 0.5 | 0.5 | — | 0.5 | 0.5 | 0.5 | 0.5 |
|  | CeO$_2$ | — | — | — | — | — | — | — | — |
|  | Sb$_2$O$_3$ | 0.6 | 0.6 | 0.6 | 0.6 | 0.6 | 0.6 | 0.6 | 0.6 |
|  | Cl$_2$ | — | 0.1 | — | — | — | — | — | — |
| Density(g/cm$^3$) |  | 5.24 | 5.23 | 5.26 | 5.23 | 5.25 | 5.26 | 5.31 | 5.39 |
| α (×10$^{-7}$/° C.) |  | 82 | 83 | 84 | 79 | 81 | 80 | 85 | 87 |
| strain point(° C.) |  | 385 | 400 | 380 | 395 | 395 | 400 | 385 | 380 |
| Liquidus temperature(° C.) |  | 620 | 645 | 550 | 700 | 630 | 690 | 620 | 615 |
| Liquidus viscosity(dPa · s) |  | 5.4 | 5.5 | 6.3 | 4.3 | 5.3 | 4.5 | 5.2 | 5.1 |
| Gamma-ray attenuation coefficient at 0.511 MeV (cm$^{-1}$) |  | 0.67 | 0.66 | 0.67 | 0.66 | 0.67 | 0.67 | 0.68 | 0.69 |

TABLE 7

|  |  | Comparative Example | |
|---|---|---|---|
|  |  | 7 | 8 |
| Glass composition (% by mass) | SiO$_2$ | 48.0 | 52.0 |
|  | PbO | 37.0 | 33.0 |
|  | B$_2$O$_3$ | — | — |
|  | Al$_2$O$_3$ | — | 0.5 |
|  | BaO | — | — |
|  | Na$_2$O | 6.5 | 7.0 |
|  | K$_2$O | 7.5 | 7.0 |
|  | CeO$_2$ | — | 0.5 |
|  | Sb$_2$O$_3$ | 1.0 | — |
|  | Cl$_2$ | — | — |
| Density(g/cm$^3$) |  | 3.36 | 3.24 |
| α (×10$^{-7}$/° C.) |  | 95 | 100 |
| strain point (° C.) |  | 350 | 370 |
| Liquidus temperature(° C.) |  | Not measurement | Not measurement |
| Liquidus viscosity (dPa·s) |  | Not measurement | Not measurement |
| Gamma-ray attenuation coefficient at 0.511 MeV (cm$^{-1}$) |  | 0.36 | 0.34 |

First, raw materials were prepared to obtain glass having a composition shown in Tables 6 and 7 and a prepared batch was then placed in a quartz crucible, followed by melting at 1,150° C., as shown in Tables 6 and 7, for 1 hour. Subsequently, the molten glass was poured on a carbon plate to be formed into a plate shape. After gradually cooling, sample glass for each evaluation was prepared.

For each of the samples thus obtained, density, thermal expansion coefficient, liquidus temperature, liquidus viscosity, and gamma-ray attenuation coefficient at gamma-ray energy (0.511 Mev) are shown in Tables 6 and 7.

The density was determined by the well-known Archimedes method.

For the thermal expansion coefficient α, a cylindrical sample of 5.0 mm in diameter and 20 mm in length was prepared and then an average thermal expansion coefficient at 30 to 380° C. was measured by a dilatometer.

In addition, the strain point was measured based on ASTM C336-71. Note that the higher strain point is favorable and it can suppress thermal deformation and thermal shrinkage of a glass substrate in the heat process.

The liquidus temperature was measured as follows. A well-washed powdery sample of 300 to 500 μm in size was placed in a platinum boat and then held in an electric furnace having a temperature gradient of 800 to 500° C. for 48 hours, followed by cooling in the air. Then, the temperature at which a crystal began to deposit in the glass was measured as the liquidus temperature of the glass. The liquidus viscosity was determined by creating a viscosity curve from viscosity obtained by the platinum pulling-up method and calculating the viscosity of glass which is equivalent to liquidus temperature from the viscosity curve.

The gamma-ray attenuation coefficient of gamma-ray energy (0.511 MeV) was calculated by calculation from the data of Photx.

As is evident from Table 6, the radiation-shielding glass for a PET examination of the present invention showed a gamma-ray attenuation coefficient of 0.66 cm$^{-1}$ or more at 0.511 Mev, thereby having a good radiation-shielding ability.

On the other hand, as is evident from Table 7, the gamma-ray shielding glass of Comparative Example 7 showed a small PbO content of 37% in the glass, so the gamma-ray attenuation coefficient was 0.36 cm$^{-1}$, resulting in small gamma-ray shielding ability. Further, the gamma-ray shielding glass of Comparative Example 8 also showed a small PbO content of 33% in the glass, so the gamma-ray attenuation coefficient was 0.34 cm$^-$, resulting in small gamma-ray shielding ability.

Next, by using a build-up factor, an example of a method of designing the plate thickness of radiation-shielding glass for medical uses according to the present invention will be described. The composition of lead glass and the physical properties thereof are specifically shown in Tables 8 and 9.

TABLE 8

| Composition (% by mass) | |
|---|---|
| SiO$_2$ | 34 |
| B$_2$O$_3$ | 3 |
| PbO | 55 |
| BaO | 5 |
| Na$_2$O | 1 |
| K$_2$O | 2 |
| Density | 4.36 g/cm$^3$ |
| Ray attenuation coefficient | 0.51/cm |
| Thermal expansion coefficient | 80 × 10$^{-7}$/° C. |

TABLE 9

| Composition (% by mass) | |
|---|---|
| SiO$_2$ | 27 |
| B$_2$O$_3$ | 1 |
| PbO | 71 |
| BaO | — |
| Na$_2$O | — |
| K$_2$O | 1 |
| Density | 5.20 g/cm$^3$ |
| Ray attenuation coefficient | 0.65/cm |
| Thermal expansion coefficient | 81 × 10$^{-7}$/° C. |

First, raw materials were prepared to obtain a radiation-shielding glass plate for medical uses having a composition shown in Tables 8 and 9 and a prepared batch was then placed in a quartz crucible, followed by melting at 1,150° C., as shown in Tables 8 and 9, for 1 hour. Subsequently, the molten glass was poured on a carbon plate to be formed into a plate shape. After gradually cooling, sample glass for each evaluation was prepared.

For each of the samples thus obtained, density, thermal expansion coefficient, and gamma-ray attenuation coefficient at gamma-ray energy (0.511 MeV) are shown in Tables 8 and 9. The density was determined by the well-known Archimedes method. For the thermal expansion coefficient α, a cylindrical sample of 5.0 mm in diameter and 20 mm in length was prepared and then an average thermal expansion coefficient at 30 to 380° C. was measured by a dilatometer. The ray attenuation coefficient of gamma-ray energy (0.511 MeV) was calculated by calculation from the data of Photx. The build-up factor B of gamma-ray energy (0.511 MeV) was calculated from the composition and the density of the glass. There are two methods for calculating the build-up factor B: one is a method of using a comparatively simple calculation formula; and the other is a method of making use of the behavior of the radiation in detail, such as absorption and scattering, in a medium between a radiation source and an evaluation point. The Monte Carlo method which is one of the latter was employed this time. Then, the build-up factor B was calculated by computer simulation for a case where lead glass is used for the shield. Calculation results of effective dose transmission for each of the case where the build-up factor B was used and the case where the build-up factor B was not used with respect to each plate thickness are shown in Tables 10 and 11. The Monte Carlo method simulates the behavior of actual radiation using a random number.

TABLE 10

0.511 MeV gamma-ray effective dose transmission (%)

| Composition 1 µt | t (cm) | Build-up factor B | Build-up factor used B × exp (−µt) | Build-up factor unused exp (−µt) |
|---|---|---|---|---|
| 0 | 0 | 1.00 | 100 | 100 |
| 1.0 | 2.0 | 1.41 | 52 | 37 |
| 3.0 | 5.9 | 1.99 | 10 | 5 |
| 5.0 | 9.8 | 2.49 | 2 | 0.7 |
| 7.0 | 13.7 | 2.94 | 0.3 | 0.09 |

TABLE 11

0.511 MeV gamma-ray effective dose transmission (%)

| Composition 2 µt | t (cm) | Build-up factor B | Build-up factor used B × exp (−µt) | Build-up factor unused exp (−µt) |
|---|---|---|---|---|
| 0 | 0 | 1.00 | 100 | 100 |
| 1.0 | 1.5 | 1.35 | 52 | 37 |
| 3.0 | 4.6 | 1.83 | 9 | 5 |
| 5.0 | 7.7 | 2.22 | 1.5 | 0.7 |
| 7.0 | 10.8 | 2.56 | 0.2 | 0.1 |

Next, the effective dose transmission of lead is shown in Table 12 which is cited from data of "Shielding calculation business manual for radiation facilities, 2000" published by the Nuclear Safety Technology Center. Note that the effective dose transmission of lead shown in Table 12 is also calculated in consideration of the build-up factor of lead against the gamma rays.

TABLE 12

Lead (business manual)

| Plate thickness (cm) | Effective dose transmission (%) |
|---|---|
| 0.2 | 78.6 |
| 0.3 | 69.0 |
| 0.4 | 60.4 |
| 0.5 | 52.6 |
| 0.7 | 39.7 |
| 1.0 | 25.7 |
| 1.5 | 12.2 |

From the results shown in Tables 10, 11, and 12, a correlation calibration curve was drawn with the plate thickness and the transmission. The plate thickness of radiation-shielding glass plate for medical uses equivalent to the transmission of each lead thickness was read from the correlation calibration curve. The results thereof are shown in Table 13.

TABLE 13

| Lead plate | | Corresponding plate thickness of composition 1 (mm) | | Corresponding plate thickness of composition 2 (mm) | |
|---|---|---|---|---|---|
| Plate thickness (mm) | Effective dose transmission (%) | Build-up factor used | Build-up factor unused | Build-up factor used | Build-up factor unused |
| 2 | 78.6 | 8.2 | 4.8 | 5.9 | 3.7 |
| 3 | 69.0 | 12.0 | 7.3 | 8.8 | 5.7 |
| 5 | 52.6 | 19.2 | 12.6 | 14.2 | 9.9 |
| 10 | 25.7 | 36.7 | 26.6 | 27.6 | 20.8 |

As is evident from Table 13, if the effective dose build-up factor is not used in designing plate thickness of radiation-shielding glass plate for medical uses, the transmission of a gamma ray becomes high and the design thereof is on the side of risk. If the examination is conducted under such a state, accumulative exposure of radiation of a person engaged in the examination is large and they are placed at risk. On the other hand, when a large build-up factor B for water, concrete, or the like is used for calculation because the build-up factor B is uncertain at the time of designing the plate thickness of radiation-shielding glass plate for medical uses, a thick shield more than needed may be required, although it is safe in terms of protection. For example, a situation, where the costs of the radiation-shielding glass plate for medical uses soar unrighteously, may be brought about when it is used for a wall or a window surrounding the PET examination equipment. On the other hand, the radiation-shielding glass plate for medical uses of the present invention uses an effective dose build-up factor calculated by the Monte Carlo method to design the plate thickness of the glass. Therefore, the above problems can be suitably avoided.

Note that when the radiation-shielding glass plate for medical uses is actually formed, the theoretical plate thickness value is suitably selected according to the shielding ability (effective dose transmission) to be required by the glass plate. Then, the glass plate with a plate thickness of 1 to 1.3 times the selected theoretical plate thickness value is formed.

Further, the reflection loss of the shielding glass plate for medical uses is preferably 3.5% or less at Na-D line. A decrease in reflection loss can be adjusted by forming a thin film on the surface of the glass plate.

Industrial Applicability

The radiation-shielding glass of the present invention is preferable for a gamma-ray shielding window for medical uses or a gamma-ray shielding protection screen for medical uses. In particular, it is preferable for a gamma-ray shielding window for a PET examination or a gamma-ray shielding protection screen for the PET examination. Further, the radiation-shielding glass of the present invention can be favorably used in peepholes of a gamma-ray irradiation room for an atomic reactor, a hot cape for fissionable material processing, and an accelerator (betatron, linac, etc.), a protection board for X-ray, a portable radiation protector, a lead glass block, radiation-shielding glasses, and the like.

The invention claimed is:

1. A radiation-shielding glass, comprising a glass composition in % by mass of 10 to 35% $SiO_2$, 55 to 80% PbO, 0 to 8% $B_2O_3$, 0 to 10% $Al_2O_3$, 0 to 10% SrO, 0 to 10% BaO, 0 to 10% $Na_2O$, and 0 to 10% $K_2O$, wherein:
the glass composition further includes 200 ppm or less of $Fe_2O_3$, 50 ppm or less of $Cr_2O_3$, and 100 to 20,000 ppm of $Sb_2O_3$, and is substantially free of $As_2O_3$, the radiation-shielding glass has a total light transmission at a wavelength of 400 nm at a thickness of 10 mm of 50% or more, and the radiation-shielding glass has a chromaticity for a C light source calculated from a total light transmission at a wavelength of 380 to 700 nm in a region surrounded by X and Y coordinates (X, Y)=(0.3101, 0.3160), (0.3250, 0.3160), (0.3250, 0.3400), and (0.3101, 0.3400).

2. A radiation-shielding glass, comprising a glass composition in % by mass of 10 to 35% $SiO_2$, 55 to 80% PbO, 0 to 8% $B_2O_3$, 0 to 10% $Al_2O_3$, 0 to 10% SrO, 0 to 10% BaO, 0 to 10% $Na_2O$, and 0 to 10% $K_2O$, wherein:

the glass composition further includes 200 ppm or less of $Fe_2O_3$, 50 ppm or less of $Cr_2O_3$, and 100 to 20,000 ppm of $Sb_2O_3$, and is substantially free of $As_2O_3$, the radiation-shielding glass has a chromaticity for a C light source calculated from a total light transmission at a wavelength of 380 to 700 nm in a region surrounded by X and Y coordinates (X, Y)=(0.3101, 0.3160), (0.3250, 0.3160), (0.3250, 0.3400), and (0.3101, 0.3400), and the radiation-shielding glass is used for a gamma-ray shielding material for a PET examination.

3. A radiation-shielding glass according to claim 1 or claim 2, wherein the glass composition further includes 0 to 20,000 ppm of $Cl_2$.

4. A radiation-shielding glass according to claim 1 or claim 2, wherein the radiation-shielding glass has a liquidus viscosity of $10^{3.5}$ dPas or more.

5. A radiation-shielding glass according to claim 1 or claim 2, wherein:

the radiation-shielding glass is a plate-like body formed in a plate shape; and the plate-like body has a plate thickness of 10 mm or more.

6. A radiation-shielding glass according to claim 1 or claim 2, wherein the radiation-shielding glass has a gamma-ray attenuation coefficient at a gamma-ray energy of 0.511 MeV of 0.5 $cm^{-1}$.

7. A method of shielding a subject from gamma rays, comprising placing a gamma-ray shielding window or a gamma-ray shielding protection screen between the subject and the source of the gamma rays, wherein the gamma-ray shielding window or the gamma-ray shielding protection screen comprises the radiation-shielding glass according to claim 1 or claim 2.

8. The method of claim 7, wherein the source of the gamma rays is a medical use.

9. The method of claim 8, wherein the medical use is a PET examination.

10. A radiation-shielding glass according to claim 1 or claim 2, wherein:

the radiation-shielding glass is a glass plate formed in a plate shape; and an effective dose build-up factor for the radiation based on a glass composition and a density of a glass plate to be formed is calculated before the formation of the glass plate, an effective dose transmission of the glass plate to be formed for the radiation is calculated by multiplying the effective dose build-up factor by a transmission when the radiation is perpendicularly incident on the glass plate to be formed, and a theoretical plate thickness value of the glass plate to be formed is determined based on the effective dose transmission, and an actual plate thickness is set to be equal to or higher than the theoretical plate thickness value.

11. A radiation-shielding glass according to claim 10, wherein the theoretical plate thickness value is obtained by further making a comparison between an effective dose transmission of lead obtained based on an effective dose build-up factor of lead with respect to the radiation and the effective dose transmission of the glass plate to be formed.

12. A radiation-shielding glass according to claim 10, wherein the theoretical plate thickness value is set to a value where the effective dose transmission of the glass plate to be formed is 60% or less with respect to a gamma ray at 0.511 MeV.

13. A radiation-shielding glass according to claim 10, wherein the effective dose build-up factor of the glass plate to be formed is calculated by Monte Carlo method.

14. A radiation-shielding glass according to claim 10, wherein when the theoretical plate thickness value is defined as t, the plate thickness is actually in the range of t or more and 1.3 t or less.

15. A radiation-shielding glass according to claim 10, wherein the radiation-shielding glass has a density of 4.00 $g/cm^3$ or more, and an effective dose transmission of 60% or less with respect to a gamma ray at 0.511 MeV.

16. A radiation-shielding glass according to claim 10, wherein the radiation-shielding glass has a size of 800 mm×1,000 mm or more.

17. A radiation-shielding glass article including the radiation-shielding glass according to claim 1 or claim 2, comprising a single plate glass formed of the radiation-shielding glass.

18. A method of manufacturing the radiation-shielding glass according to claim 1 or claim 2, comprising melting a glass material in a melting furnace to obtain a molten glass, wherein a melting temperature of the molten glass is 1,400° C. or less.

19. A method of manufacturing the radiation-shielding glass according to claim 1 or claim 2, comprising the steps of:

melting a glass material in a melting furnace to obtain a molten glass; and forming the molten glass into a plate glass, wherein the plate glass is formed with a roll out method.

20. A method of manufacturing radiation-shielding glass according to claim 18, further comprising a step of setting a theoretical plate thickness value, including:

calculating an effective dose build-up factor for the radiation based on a glass composition and a density of a glass plate to be formed before a step of forming a glass plate from a molten glass;

calculating an effective dose transmission of the glass plate to be formed for the radiation by multiplying the effective dose build-up factor by a transmission when the radiation is perpendicularly incident on the glass plate to be formed; and setting the theoretical plate thickness value of the glass to be formed based on the effective dose transmission.

21. A method of manufacturing the radiation-shielding glass for medical uses according to claim 20, wherein in the step of setting the theoretical plate thickness value, the theoretical plate thickness value is set by making a comparison between an effective dose transmission of lead obtained based on an effective dose build-up factor of lead against the radiation and an effective dose transmission of the glass plate to be formed.

22. A method of manufacturing radiation-shielding glass according to claim 19, further comprising a step of setting a theoretical plate thickness value, including:

calculating an effective dose build-up factor for the radiation based on a glass composition and a density of a glass plate to be formed before a step of forming a glass plate from a molten glass;

calculating an effective dose transmission of the glass plate to be formed for the radiation by multiplying the effective dose build-up factor by a transmission when the radiation is perpendicularly incident on the glass plate to be formed; and setting the theoretical plate thickness value of the glass to be formed based on the effective dose transmission.

23. A method of manufacturing radiation-shielding glass according to claim 22, further comprising a step of setting a theoretical plate thickness value, including:

calculating an effective dose build-up factor for the radiation based on a glass composition and a density of a glass plate to be formed before a step of forming a glass plate from a molten glass;

calculating an effective dose transmission of the glass plate to be formed for the radiation by multiplying the effective dose build-up factor by a transmission when the radiation is perpendicularly incident on the glass plate to be formed; and setting the theoretical plate thickness value of the glass to be formed based on the effective dose transmission.

24. A method of using a radiation-shielding glass, comprising producing a gamma-ray shielding window for a PET examination or a gamma-ray shielding protection screen for a PET examination from the radiation-shielding glass having the properties as defined in claim 1, and arranging the window or screen between a patient to which a test drug has been administered and a tester in the PET examination.

* * * * *